May 17, 1966   W. A. HYLAND ETAL   3,251,325
GRAIN DRILL FURROW OPENER
Filed Aug. 30, 1962   3 Sheets-Sheet 1
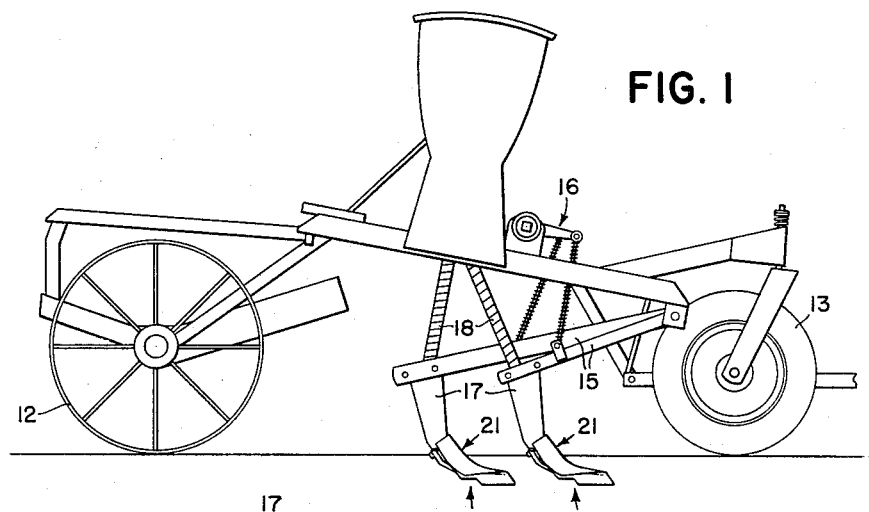
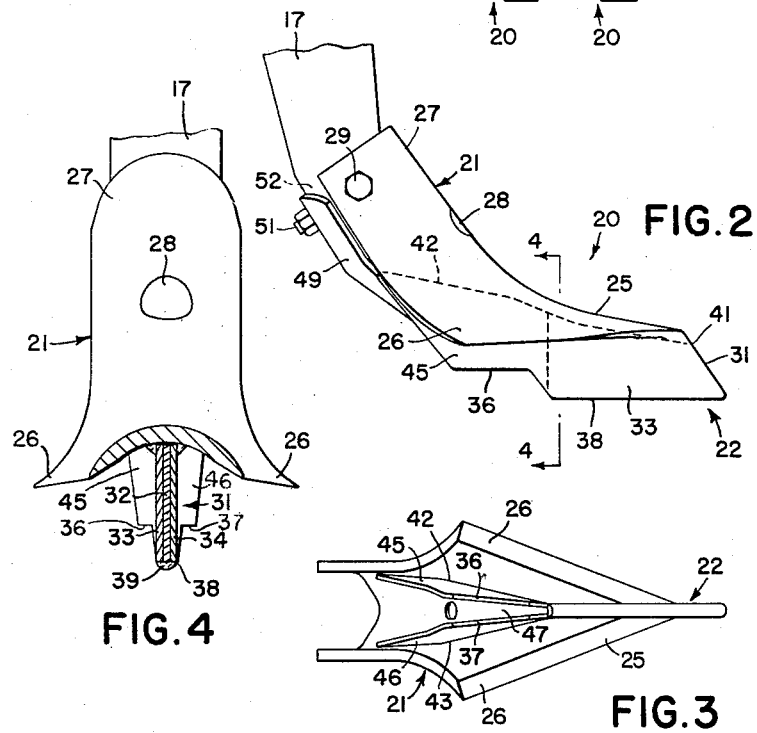
INVENTORS.
WILLIAM A. HYLAND
ARNOLD E. WELCK
BY
Roger C Johnson
ATTORNEY May 17, 1966 W. A. HYLAND ETAL 3,251,325
GRAIN DRILL FURROW OPENER
Filed Aug. 30, 1962 3 Sheets-Sheet 2

INVENTORS.
WILLIAM A. HYLAND
ARNOLD E. WELCK
BY
*Roger C. Johnson*
ATTORNEY

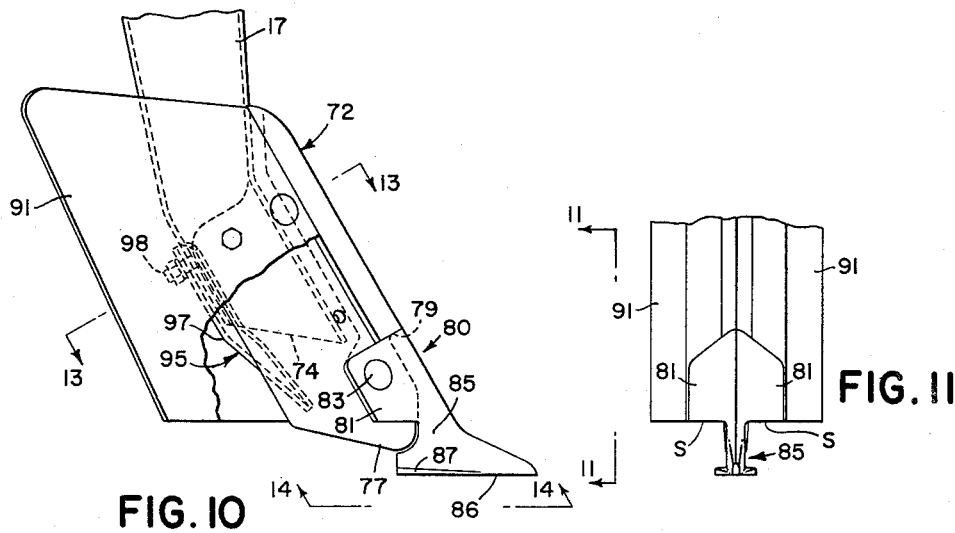
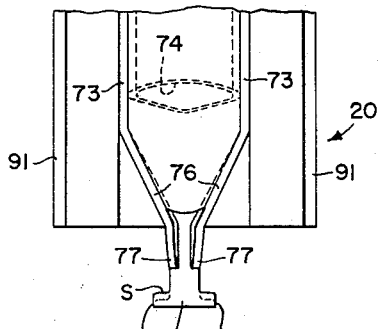
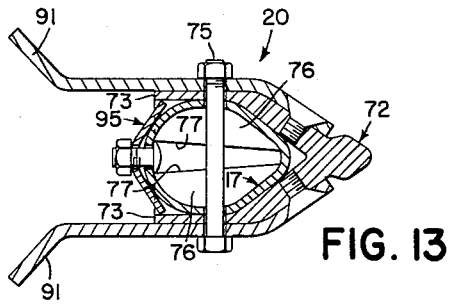
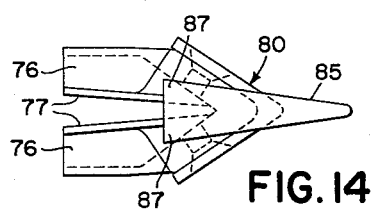

United States Patent Office 3,251,325
Patented May 17, 1966

3,251,325
GRAIN DRILL FURROW OPENER
William A. Hyland and Arnold E. Welck, Horicon, Wis., assignors to Deere & Company, Moline, Ill., a corporation of Delaware
Filed Aug. 30, 1962, Ser. No. 220,435
5 Claims. (Cl. 111—86)

This invention relates generally to agricultural implements and more particularly to planting implements such as grain drills and the like.

The object and general nature of this invention is the provision of a grain drill constructed and arranged to be operated in dry land areas where there is only a minimum amount of moisture available to produce germination of the seed. In these areas there usually is at fall seeding time a layer of dry dusty soil on top of the ground about 4 to 6 inches deep overlying a lower layer of soil having some moisture. To secure a good stand it is essential to deposit the seed in this moist layer and to have the seed surrounded by moist soil in order to ensure good germination and the development of a good root system before winter.

Further, it is a feature of this invention to provide a grain drill furrow opener that forms a narrow furrow in the lower layer of moist soil, places the seed in this furrow and then covers the seed with moist soil without permitting any soil from the upper layer of dry soil to fall down into direct contact with the seed and without bringing up more than a relatively small amount of moist soil to the top where it will dry out and the moisture it contained lost.

More specifically, it is a feature of this invention to provide a grain drill furrow opener having a lower narrow portion adapted to penetrate into the moist layer of soil and form a relatively narrow seed-receiving slot and having generally horizontal laterally extending shoulders at the lower edge of the narrow portion that function to crumble the lower portions of the side walls of the furrow so as to ensure that the seed, which is deposited immediately in rear of the narrow portion, shall be covered and entirely surrounded by moist soil, before portions of the upper layer of soil can roll down into the furrow and into direct contact with the seed.

A further feature of this invention is the provision of a grain drill furrow opener having an upper wing-like section and a lower fore and aft extending soil-penetrating vertical fin-like section, with means forming downwardly facing generally horizontal edge portions on said wing-like sections rearwardly of said fin-like section and depositing said soil portions in said slot.

Another feature of this invention is the provision of a furrow opener runner or soil slitting portion having a generally planar forward end and upwardly and rearwardly extending wing sections having lower generally horizontal rearwardly diverging lower downwardly facing edges adapted to remove portions of the side walls of the furrow formed by said soil slitting planar vertical section.

These and other objects and advantages of the present invention will be apparent to those skilled in the art after a consideration of the following detailed description, taken in conjunction with the accompanying drawings in which:

FIG. 1 is a fragmentary side view of portions of a grain drill in which furrow openers of this invention have been incorporated.

FIG. 2 is a side view, on an enlarged scale, of the seed boot and shovel type furrow opener, showing the same in operating position.

FIG. 3 is a bottom view of the furrow opener.

FIG. 4 is a sectional view taken along the line 4—4 of FIGS. 2 and 3.

FIG. 10 is a side view of a second modified form of furrow opener incorporating the principles of our invention.

FIG. 11 is a front view of a furrow opener constructed as shown in FIG. 10, being a view taken generally along the line 11—11 of FIG. 10.

FIG. 12 is a rear view looking forwardly of the lower portion of the furrow opener shown in FIG. 10.

FIG. 13 is a sectional view taken generally along the line 13—13 of FIG. 10.

FIG. 14 is a bottom view generally along the line 14—14 of FIG. 10 of the point section of the opener of FIG. 10 and certain cooperating parts.

Figure 5:
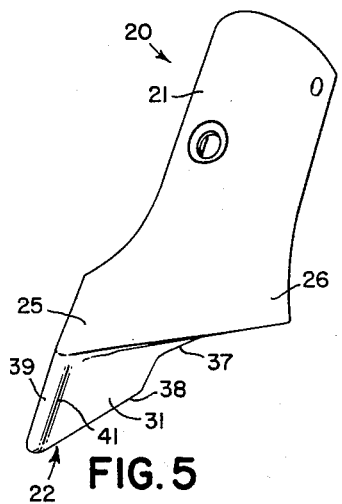
FIG. 5 is a perspective view of the furrow opener of this invention showing portions of the upper shovel section and the lower runner or soil-slitting section.

Referring first to FIG. 1, the grain drill in which the principles of the present invention have been incorporated is largely conventional, embodying a frame including bars extending in a generally fore and aft direction and supported at their rear ends on suitable press wheels 12. The front portion of the frame is conventionally supported on caster wheels 13 or other suitable means. The forward portion of the frame pivotally receives a plurality of drawbars 15 that are normally raised and lowered by suitable means 16. The rear end of each of the drawbars 15 carries a seed boot 17 into which seed is delivered by a seed tube 18. The upper end of the latter is connected with the hopper of the grain drills so as to receive seed metered out by the seed feeding means. Normally, the seed boot 17 is fixed in any suitable way to the associated draw bar 15.

According to this invention we provide new and improved furrow opener means indicated in its entirety by reference numeral 20, especially constructed and arranged to provide for sowing grain under dry land conditions. The furrow opener 20 will now be described.

The furrow opener of this invention is adapted to be fixed to a lower portion of a seed boot 17 and is shaped to extend downwardly and forwardly therefrom. The furrow opener 20 of this invention includes an upper shovel section 21, generally of conventional configuration, and a lower runner section 22. The upper or shovel section 21 has a forward point 25, laterally and outwardly flaring wings 26, and an upper generally U-shaped attaching section 27 adapted to embrace the lower part of the seed boot 17 and apertured to receive a plow bolt 28 fixing the furrow opener in place on the seed boot 17. A second bolt 29 completes the attachment of the furrow opener to the seed boot 17.

The lower runner section 22 comprises a forward fin portion 31 in the form of a planar soil-slitting member extending fore-and-aft in a vertical plane and made up of center reenforcing plate 32 and right- and left-hand side plates 33 and 34 (FIG. 4). The center plate 32 is flat and the forward end portions of the side plates 33 and 34 are flat so as to lie close against the opposite sides of the center plate 32. The intermediate and rear portions of the side plates 33 and 34 extend rearwardly and upwardly in divergent relation and the intermediate portions, just behind the vertical fin section 31, have lower downwardly facing rearwardly diverging edges 36 and 37 (FIG. 3) located a relatively short distance above the lowermost edge 38 of the fin section 31. The three plates 32, 33 and 34 are rigidly secured together, as shown in FIGS. 3 and 4, by a weld bead, as indicated at 39, preferably with hard facing material added thereto, disposed along the lower edge 38 and the forward end of the fin section 31, as indicated at 41.

Figure 6:
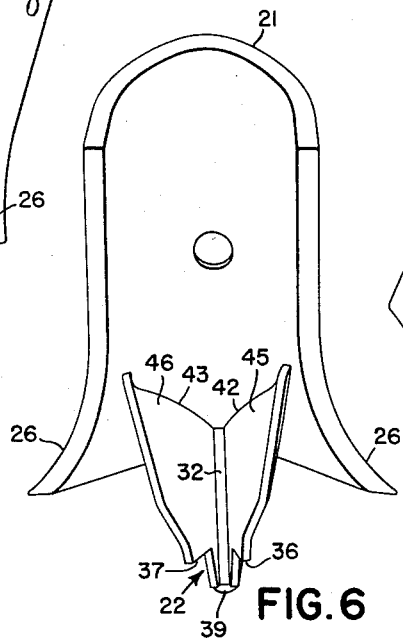
FIG. 6 is a perspective view of the rear portion of the furrow opener of FIG. 4.
Figure 7:
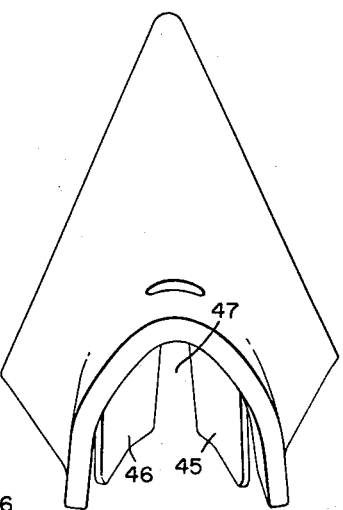
FIG. 7 is a top view of the furrow opener of FIG. 5.

The upper edges 42 and 43 of the rearwardly and upwardly diverging wing sections, indicated in FIGS. 2 and 3 at 45 and 46, are shaped so as to fit against the inner faces of the shovel wings 26, being welded thereto so that the shovel section 21 and the runner section 22 form a single rigid furrow opener. The lower intermediate portions of the runner wings 45 and 46 are shaped, as best shown in FIG. 6, to lie close together, forming a guide slot 47 (FIG. 3) through which seed delivered thereto through the lower end of the seed boot 17 may be discharged. As best shown in FIG. 2, a seed deflector 49 is fixed by a bolt 51 to the lower end portion 52 of the seed boot 17.

As can best be seen from FIG. 3, the seed guide 45, 46 terminates in lower downwardly facing rearwardly diverging edges 36 and 37, which lie above the level of the lower edge 38 of the fin section 31, present portions lying laterally outwardly of the sides of the fin section that guide the seed into the lower portions of the slot formed by the fin section 31. The laterally outward pressure exerted by the wing sections 45 and 46 immediately above the rearward portion of the diverging edges 36 and 37 serve to cause some of the moist soil from the sides of the slot to fall into the bottom of the slot and completely cover the seed therein, such soil portions falling into the slot underneath the edges 36 and 37.

Figure 8:
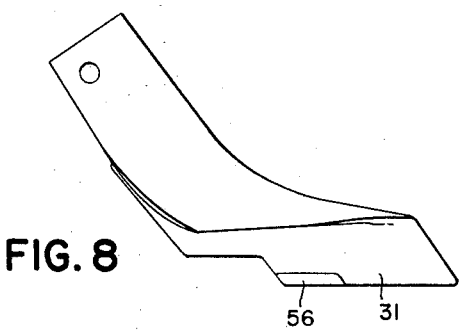
FIG. 8 is a side view similar to FIG. 2, showing a modified form of construction in which the runner section is provided with soil-crumbling laterally outwardly extending shoulders.
Figure 9:
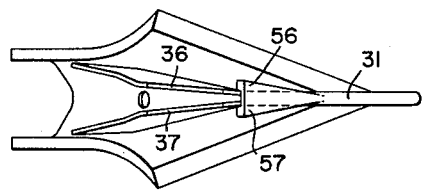
FIG. 9 is a bottom view of the furrow opener of FIG. 8.

FIGS. 8 and 9 show a modified form of furrow opener construction wherein a furrow opener, such as is shown in FIGS. 2, 3 and 4, is provided with laterally outwardly extended shoulders 56 and 57 are formed on or carried by opposite sides of the fin section 31 well toward the rear thereof and just forward of the downwardly facing edges 36 and 37. Each of the shoulders 56 and 57 is rounded at its front end, as shown in FIG. 8, and tapers in lateral dimension from front to rear, as shown in FIG. 9. As the furrow opener moves through the soil the shoulders 56 and 57 serve to crumble portions of the soil from the sides of the slot formed by the fin or runner 31 so as to ensure that moist soil is brought down to cover the seed deposited in the slot before any dry soil from the top of the ground can roll down into the slot.

A further form of this invention is shown in FIGS. 10–14, and referring now to these figures it will be seen that in this form a shovel bracket 72, generally V-shaped in cross section (FIG. 13), is carried by the lower portion of the seed tube 17 and has rearwardly extending bifurcated sections 73 that embrace the lower portion of the seed tube and are shaped to fit snugly against the sides of the seed tube, as shown in FIG. 13. A bolt 75 is provided to fix the bracket 72 to the seed tube. The side flanges 73 of the bracket 72 extend downwardly beyond the lower portion of the seed tube, the lower end of the latter being indicated at 74 in FIG. 10, and these portions of the side flanges 73 converge downwardly, as indicated at 76 in FIG. 12, terminating in a pair of closely spaced edge portions 77 that serve as seed confining means.

Secured to the lower end of the bracket 72, which is dimensionally reduced, as indicated at 79, is a furrow opener spear point 80 that includes side portions 81 fixed to the lower end of the bracket 72 by any suitable means such as a pair of cap screws 83 that extend through suitable apertures in the side portions 81 of the spear point 80. The latter includes a downwardly extending narrowed portion 85, the lowermost portion of which is flat on the bottom, as indicated at 86 and widened by means of laterally extending shoulders 87 of generally wedged shaped configuration, shoulders 87 being thicker at the rearmost ends than at the forward ends. The shoulders 87 are also somewhat wider at the rear ends than at the forward ends, as will be seen from FIG. 14. As will be seen from FIG. 10, the lower closely spaced portions 77 of the bracket 72 extends generally rearwardly from the spearpoint 80, the portions 76 being spaced apart approximately the same amount as the lateral thickness of the narrowest portion 85 of the spearpoint 80.

Laterally and rearwardly divergent wings 91 are fixed to opposite sides of the upper portions of the bracket 72. The wings function to throw soil laterally and outwardly away from the furrow opener. Seed delivered through the seed boot 17 is confined laterally by the lower closely spaced portions 77 and are also directed forwardly, so as to fall immediately behind the spear point shoulders 87 by a diverter plate 95 that is curved in cross section (FIG. 13) and bent forwardly, as at 97, FIG. 10. The diverter plate 95 is fastened in place to the seed tube 17 by a bolt 98.

In this form of the invention, the grain drill is operated with the furrow openers lowered to a point where the spear point 30 enters the moist soil to the depth of about an inch or more, disposing the shouldered portions S of the upper portion of the spear point 80 at a point corresponding generally to the zone of demarkation between the upper dry soil and the lower layer of moist soil. Since the lower part or face of the spear point 80 and the shoulder portions 87 are generally flat, the same being true of the forms of this invention shown in FIGS. 1–9, the furrow openers of this invention tend to maintain a generally uniform depth of penetration. The lower part 85 of the spear point, particularly that portion that enters the layer of moist soil, is relatively narrow, and, hence, forms a relatively narrow slot to receive the seed, the latter being guided into the narrow slot by the spaced apart portions 77 of the spear point bracket and the plate 95.

The laterally directed wedge-shaped shoulders 87 formed on the rear portion of the lower part of the spear point 85, like the shoulders 56 and 57 shown in FIGS. 9 and 10, extend laterally outwardly under the walls of the relatively narrow slot formed in the moist soil to receive the seed. These shoulders crumble portions of the side walls of the slot so that these crumbled portions of the moist soil fall directly onto the seed in the bottom of the slot so that the seeds are entirely surrounded by moist soil. Thus, even though some of the upper dryer portions of the soil may fall into the upper part of the narrow slot, none of this dry soil comes into direct contact with the seed; instead the seed, being entirely surrounded by moist soil, germinates readily and produces a strong and vigorous root system so that the plant as it develops has sufficient strength and vitality to grow upwardly through the overlying portions of dryer soil. Generally, it is desirable to have a press wheel behind each furrow opener for the purpose of compressing the crumbled and moist soil about the seed to assure good capillary action.

While we have shown and described above the preferred structure in which the principles of our invention have been incorporated, it is to be understood that our invention is not to be limited to the particular details, shown and described above, but that, in fact, widely different means may be employed in the pratcice of the broader aspects of our invention.

What we claim, therefore, and desire to secure by Letters Patent is:

1. A runner attachment for a grain drill furrow opener shovel of the type having sides, a forward point, and laterally outwardly and rearwardly flaring lower edges, the latter and said point lying in a generally horizontal plane and the sides of said shovel extending laterally inwardly, upwardly and rearwardly from said lower edges, said attachment comprising a fore and aft extending relatively narrow soil-slitting fin section lying in a generally vertical plane, the fin having substantially parallel sides spaced appreciably closer together than the sides of said shovel, whereby the fin section is adapted to form a furrow in the soil in the form of a narrow slot below said shovel, means fixing said fin section to said shovel in a generally vertical position lying generally below the aforesaid horizontal plane so as to form said slot in the soil below the soil contacted by said shovel, and laterally outwardly extending shoulders fixed to the lower rear portions of said fin section for crumbling the lower portions of the side walls of the furrow formed by said fin section, whereby said crumbled side wall portions will fall into the slot opened by said fin section before soil passing over said shovel sides can fall into said slot.

2. A furrow opener for a seeding implement including a seed tube through which seed is dispensed, said furrow opener comprising a shovel section having sides, a lower forwardly extending point portion, laterally outwardly and rearwardly flaring lower edges, the latter and said point portion lying in a generally horizontal plane, the sides of said shovel having over and under surfaces which extend laterally inwardly, upwardly and rearwardly from said lower edges, and an upper portion shaped to embrace the lower part of said seed tube, a generally fore-and-aft runner section comprising a pair of plates having intermediate and rear portions and a forward vertical planar fin portion formed with a horizontal lower edge and a front edge extending downwardly and forwardly from the point portion of the shovel section and forming a moist soil entering point, the intermediate and rear portions of said pair of plates having soil contacting surfaces extending diverging upwardly and rearwardly, the intermediate portion having closely spaced apart seed guiding inner surfaces terminating in spaced apart horizontal rearwardly diverging lower edges spaced above the plane of the horizontal lower edge of said fin portion and below the horizontal plane formed by the point portion and the lower edges of said shovel section, the rear portion having spaced apart seed guiding inner surfaces formed as a continuance of the inner surface of the intermediate portion, said rear surfaces terminating in spaced apart upwardly and rearwardly diverging lower edges, and means fixing the upper edges of said pair of plates to said laterally inwardly, upwardly and rearwardly extending under surface, the parts being so arranged and constructed that in operation the fin portion of the runner section will form a relatively narrow slot in moist soil, the inner surfaces of the intermediate portion will guide seed into the narrow slot and the rearward lower outer surfaces of the intermediate portion will extend beyond the width of the slot and remove some of the moist soil from the sides of the slot and deposit the removed soil into the bottom of the slot and completely cover the seed therein.

3. A furrow opener for a seeding implement including a seed tube through which seed is dispensed, said furrow opener comprising a shovel section having sides, a lower forwardly extending point portion, laterally outwardly and rearwardly flaring lower edges, the latter and said point portion lying in a generally horizontal plane, the sides of said shovel having over and under surfaces which extend laterally inwardly, upwardly and rearwardly from said lower edges, and an upper portion shaped to embrace the lower part of said seed tube, a generally fore-and-aft runner section comprising a pair of side plates each having intermediate and rear portions and a forward vertical planar fin portion formed with a horizontal lower edge and a front edge extending downwardly and forwardly from the point portion of the shovel section, a center reinforcing plate disposed between the forward portion of said side plates, means rigidly securing said side plates to said center plate, said means including a weld bead having hard facing material added thereto disposed along the lower and forward edges of said plates, the rearward portion of said side plates extending divergingly upwardly and rearwardly and having lower closely spaced seed guiding inner surfaces terminating in spaced apart horizontal lower edges spaced above the plane of the horizontal lower edge of said fin portion and below the horizontal plane formed by the point portion and the lower edges of said shovel section, and means fixing the upper edges of said pair of plates to the said laterally inwardly, upwardly and rearwardly extending under surface, the parts being so arranged and constructed that in operation the fin portion of the runner section will form a relatively narrow slot in the moist soil, and the inner surfaces of the rearward portion will guide seed into the narrow slot.

4. A runner attachment for a grain drill furrow opener shovel of the type having a forward point, laterally outwardly and rearwardly flaring lower edges, the latter and said point lying in a generally horizontal plane and the sides of said shovel extending laterally, inwardly, upwardly and rearwardly from said lower edges, said attachment comprising a fore-and-aft extending relatively narrow fin section lying in a generally vertical plane and adapted to form a furrow in the soil in the form of a narrow vertical slot lying generally below the aforesaid horizontal plane, said fin section having a lower horizontal edge and a front edge extending downwardly and forwardly, seed guide means connected substantially rigidly to the rear part of said fin section, said seed guide means including laterally spaced apart portions extending rearwardly and upwardly in diverging relation from the rear part of said fin section, the lower edges of said laterally spaced apart portions being generally horizontal and lying below said horizontal plane but above the plane of the lower edge portion of said fin section, whereby seed may be guided downwardly into the slot opened by said narrow fin section and the laterally outer portions of said lower edges of the seed guide means being spaced apart greater than the lateral thickness of said fin section, whereby said lower edges remove some of the moist soil from the side walls of said slot below said horizontal plane and deposit the removed soil in the bottom of the slot, said fin section being provided with laterally outwardly extending shoulders fixed to the lower rear portions of said fin section for crumbling the lower portions of the side walls of the furrow formed by the narrow fin section whereby said crumbled side wall portions will fall into the slot opened by said fin section before soil passing over said shovel sides can fall into said slot.

5. A furrow opener for a seeding implement including a seed tube through which seed is dispensed, said furrow opener comprising a shovel section having sides, a lower forwardly extending point portion, laterally outwardly and rearwardly flaring lower edges, the latter and said point portion lying in a generally horizontal plane, the sides of said shovel having over and under surfaces which extend laterally inwardly, upwardly and rearwardly from said lower edges, and an upper portion shaped to embrace the lower part of said seed tube, a generally fore-and-aft runner section comprising a pair of side plates each having intermediate and rear portions and a forward vertical planar fin portion formed with a horizontal lower edge and a front edge extending downwardly and forwardly from the point portion of the shovel section, a center reinforcing plate disposed between the forward portion of said side plates, means rigidly securing said side plates to said center plate, said means including a weld bead having hard facing material added thereto disposed along the lower and forward edges of said plates, the center reinforcing plate and the forward portion of the side plates forming a moist soil entering point, the intermediate and rear portions of said pair of plates extending divergingly upwardly and rearwardly and the intermediate portions having lower closely spaced seed guiding inner surfaces terminating in spaced apart horizontal lower edges spaced above the plane of the horizontal lower edge of said fin portion and below the horizontal plane formed by the point portion and the lower edges of said shovel section, the rearward lower outer surfaces of the intermediate portion being spaced apart a distance substantially greater than the width of said planar fin portion, and means fixing the upper edges of said pair of plates to said laterally inwardly, upwardly and rearwardly extending under surface, the parts being so arranged and constructed that in operation the fin portion of the runner section will form a relatively narrow slot in moist soil, the inner surfaces of the intermediate portion will guide seed into the narrow slot, and the rearward lower outer surfaces of the intermediate portion will extend beyond the width of the slot and remove some of the moist soil from the sides of the slot and deposit the removed soil into the bottom of the slot and completely cover the seed therein.

References Cited by the Examiner

UNITED STATES PATENTS

| | | | |
|---|---|---|---|
| 230,235 | 7/1880 | Caldwell | 172—731 |
| 422,603 | 3/1890 | Loughry | 111—83 |
| 461,537 | 10/1891 | Lindgren | 172—725 |
| 635,752 | 10/1899 | Denyes | 111—86 |
| 742,872 | 11/1903 | Jacobs | 111—83 |
| 1,143,907 | 6/1915 | Hedges | 172—720 |
| 1,184,900 | 5/1916 | Vogel | 111—86 |
| 1,416,331 | 5/1922 | Campbell | 111—86 |
| 2,315,204 | 3/1943 | Holle | 111—86 |
| 2,598,121 | 5/1952 | Hannibal | 111—7 |
| 2,619,054 | 11/1952 | Bell | 111—7 |
| 2,769,412 | 11/1956 | Holle | 111—85 |
| 2,885,978 | 5/1959 | Miller | 111—86 |
| 3,177,830 | 4/1965 | Zimmerman | 111—86 X |

FOREIGN PATENTS

| | | |
|---|---|---|
| 103,830 | 4/1938 | Australia. |
| 40,155 | 7/1914 | Sweden. |

ABRAHAM G. STONE, *Primary Examiner.*

A. J. CASTORINA, WILLIAM A. SMITH III,
*Assistant Examiners.*